(12) United States Patent
Dumitrascu

(10) Patent No.: US 7,708,315 B1
(45) Date of Patent: May 4, 2010

(54) TRUCK MUD FLAP SUSPENSION

(76) Inventor: Ionel S. Dumitrascu, 3017 Douglas Blvd., Suite 300, Roseville, CA (US) 95661

( * ) Notice: Subject to any disclaimer, the term of this patent is extended or adjusted under 35 U.S.C. 154(b) by 277 days.

(21) Appl. No.: 11/707,396

(22) Filed: Feb. 15, 2007

(51) Int. Cl.
*B62D 25/18* (2006.01)
*B62D 27/04* (2006.01)

(52) U.S. Cl. ................................ 280/848; 280/851

(58) Field of Classification Search ........... D12/181, D12/184, 185
See application file for complete search history.

(56) References Cited

U.S. PATENT DOCUMENTS

| | | | | |
|---|---|---|---|---|
| 1,579,623 A | * | 4/1926 | Atherton | 280/851 |
| 1,768,445 A | * | 6/1930 | Gauchot | 280/157 |
| 2,000,813 A | * | 5/1935 | Anchor | 280/849 |
| 2,640,714 A | * | 6/1953 | Garner et al. | 280/851 |
| 2,652,266 A | * | 9/1953 | Miller | 280/851 |
| 2,721,760 A | | 10/1955 | Lapham | |
| 2,801,867 A | * | 8/1957 | Childreth | 280/851 |
| 2,872,211 A | * | 2/1959 | Barrett | 280/851 |
| 3,165,360 A | * | 1/1965 | Saxton et al. | 298/1 SG |
| 3,310,344 A | | 3/1967 | Beintum | |
| 3,806,196 A | * | 4/1974 | Cole et al. | 298/1 SG |
| 3,940,165 A | * | 2/1976 | Sogoian | 280/851 |
| 3,954,281 A | * | 5/1976 | Juergens | 280/851 |
| 4,319,764 A | * | 3/1982 | Whitaker | 280/154 |
| 4,359,232 A | * | 11/1982 | Maccari, Sr. | 280/851 |
| 4,695,070 A | | 9/1987 | Knox | |
| 4,877,267 A | * | 10/1989 | Leonard | 280/848 |
| D308,958 S | | 7/1990 | Knox | |
| 5,582,431 A | | 12/1996 | Anderson | |
| 6,158,775 A | * | 12/2000 | Nickels | 280/847 |
| 6,446,900 B1 | | 9/2002 | Syska | |
| 6,623,038 B2 | | 9/2003 | Heem | |
| 6,799,808 B1 | | 10/2004 | Walters | |

* cited by examiner

*Primary Examiner*—S. Joseph Morano
*Assistant Examiner*—Chiedu A Chibogu
(74) *Attorney, Agent, or Firm*—Heisler & Associates

(57) ABSTRACT

A suspension is provided for mud flaps to be deployed behind wheels of a vehicle. The suspension allows for resilient translation of the mud flaps, such as should they get pinched against a curb and the wheels. A housing is adapted to be coupled to a bumper or other frame portion of the vehicle. The housing supports a spring therein. Cables are coupled to opposite ends of the spring and also to one of the mud flaps. When downward forces are exerted on one of the mud flaps, the cable associated allows the mud flap to translate downward slightly and cause the spring to be extended. When the loads subside, the spring causes the mud flap to return. In one embodiment a single suspension suspends two mud flaps over separate wheels. In a second embodiment, the suspension supports a single mud flap over a single wheel or wheel set.

5 Claims, 4 Drawing Sheets

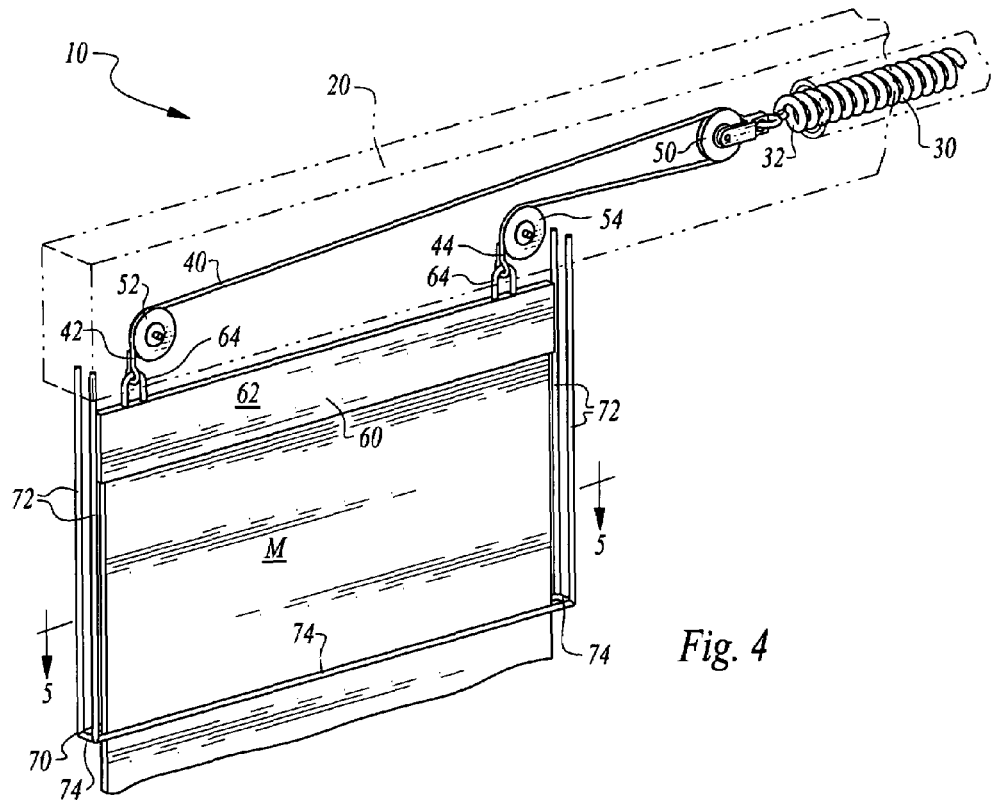
Fig. 4
Fig. 5
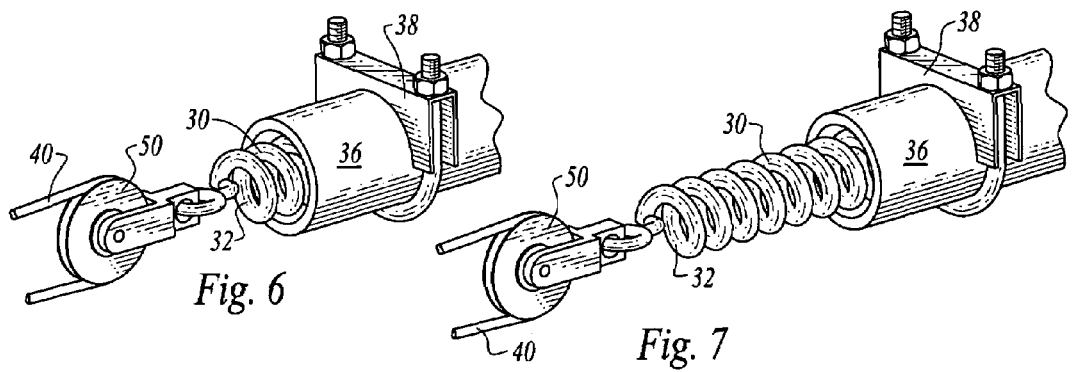
Fig. 6
Fig. 7

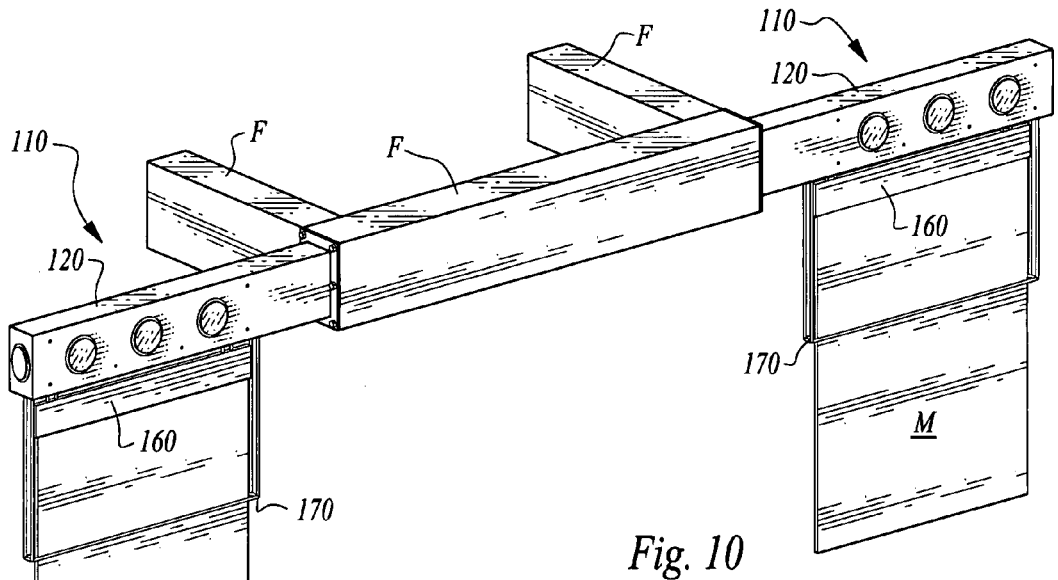
*Fig. 10*
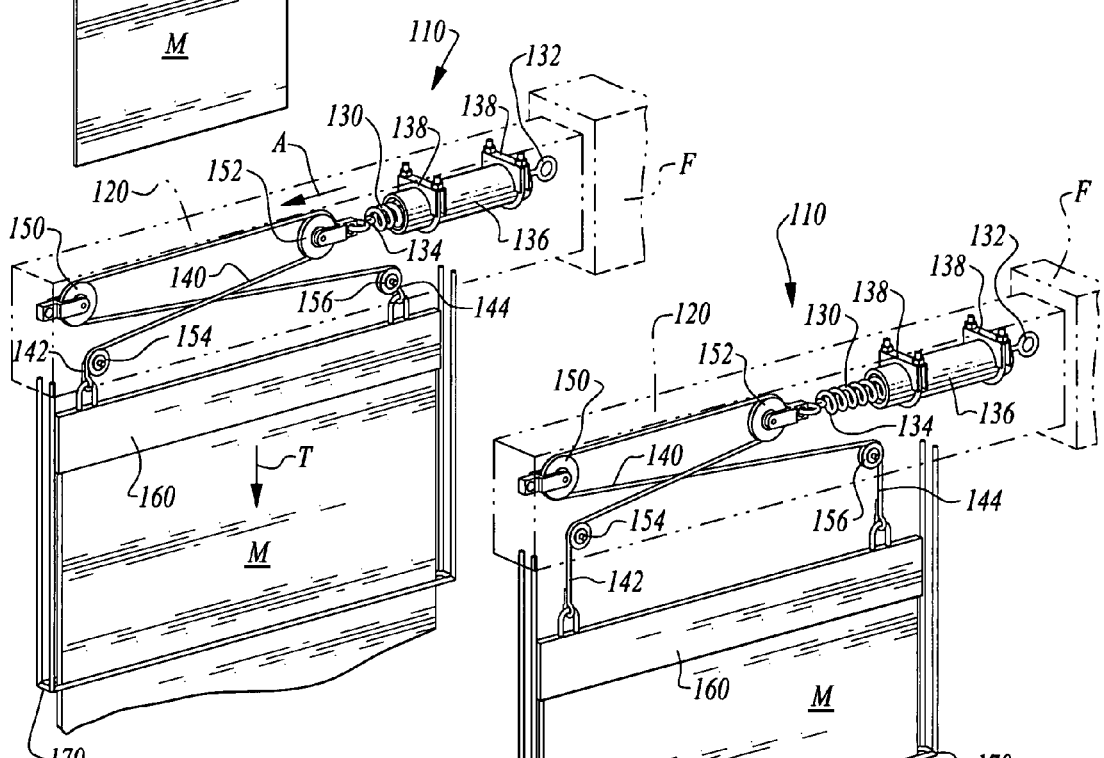
*Fig. 11*
*Fig. 12*

TRUCK MUD FLAP SUSPENSION

FIELD OF THE INVENTION

The following invention relates to mud flaps for trucks, and especially large trucks with mud flaps suspended behind the wheels and wheel pairs of the truck and trailers towed by the truck. More particularly, this invention relates to suspension systems for supporting the mud flaps in position behind the wheels of the truck in a flexible and resilient fashion, such as to allow optimal positioning of the mud flaps and prevent damage to the mud flaps or separation of the mud flaps from the vehicle.

BACKGROUND OF THE INVENTION

Mud flaps or analogous systems are required by certain trucks to minimize the potential for debris to be kicked up by truck wheels, possibly causing damage to other vehicles. Such mud flaps are typically in the form of planar flexible heavy rubber structures suspended in a vertical plane from upper ends thereof coupled to a bumper or other suspension arm behind wheels of the vehicle. Such suspension is typically rigid in form.

For mud flaps to function optimally, they should be as close to the roadway as possible. However, low positioning of the mud flaps can be problematic. For instance, when a truck is backing up, it is often desirable to back up until rear wheels of the vehicle bump against a curb or other obstruction. If the mud flaps are in an optimal low position, lower edges of the mud flaps will be pinched between the wheels of the vehicle and the curb. Even the slightest additional movement of the truck causes very high downward tension loads on the mud flap, often causing the mud flap to tear, or bending of rigid support arms holding the mud flaps. Such downward loads associated with pinching of the mud flaps can be translational only in a downward direction, or can be both downward and rotational, particularly if only one corner of the mud flap becomes trapped. Translational loads and rotational loads have a different affect on the mud flap.

One prior art mud flap suspension system usable primarily only on trucks having a central frame involves a cantilevered housing extending perpendicularly from the central frame directly behind the wheels of the vehicle. This cantilevered support housing is known in at least some systems to be attached through a heavy spring which facilitates a small amount of pivoting of the cantilevered support housing relative to the central frame of the truck. The mud flaps are rigidly mounted to the cantilevered support housing.

Such systems are not entirely desirable in that only a small amount of mud flap downward travel is facilitated, and the pivoting of the cantilevered arm is only optimal in a small number of mud flap pinching scenarios. For instance, mud flaps can be pinched and pulled downward in a translating motion, can be pinched and rotated toward a center of the truck, or pinched and rotated away from a center of the truck. Prior art spring mounted cantilevered housing mud flap suspension systems only best accommodate a pinching and rotating toward a centerline of the truck motion; with the mud flaps returning to their original position when pinching loads subside. Accordingly, a need exists for a resilient mud flap suspension system that can accommodate a large amount of mud flap travel with both translation and/or rotation.

SUMMARY OF THE INVENTION

This invention provides a mud flap suspension system that allows the mud flaps to resiliently travel away from a standard position, such as when pinched against a curb. In particular, a housing is rigidly mounted to a bumper or other frame portion of the truck or other vehicle directly behind the wheels of the vehicle to be protected by the mud flaps. A resilient suspension system for the mud flaps is supported within the housing. This suspension system includes a spring or other resilient link and a cable or other elongate flexible substantially inelastic link extending between the mud flap and one end of the spring.

In a first embodiment of the invention, a single spring is provided with two cables, each cable coupled to an opposite end of the spring and supporting one of the two mud flaps. The cables are preferably coupled to the spring through a pulley, rather than with fixed attachments. Ends of the cables are each coupled to a common mud flap, preferably at laterally spaced locations on the mud flap. Pulleys, rollers or other routers are interposed along the cable pathway to change substantially vertical orientation of the cables adjacent the mud flaps to substantially horizontal orientation adjacent ends of the spring, with the spring oriented horizontally between the two cables.

With this suspension, the mud flaps can both translate and rotate by causing the spring or other resilient link to be temporarily elongated. When tension forces are relived, the spring causes the mud flaps to resiliently return to their original position. A guide surrounds upper portions of the mud flaps to ensure that the mud flaps return to their precise original position after loads such as pinching loads are removed from the mud flaps.

In a second embodiment of the invention, separate housings are provided for each side of the vehicle that cantilever perpendicularly away from a frame extending along a direction of vehicle travel. Within the housing, a spring is provided having a fixed end coupled to the housing and a free end. The free end is coupled to the cables, preferably through a pulley, with the cable again having two ends mounted to laterally spaced locations on the mud flaps. Pulleys, rollers or other routers are interposed along the cable pathway to convert substantially vertical translation of the mud flaps to substantially horizontal translation adjacent the free end of the spring or other resilient link. In this embodiment, two separate assemblies would be mounted on either side of the central frame to accommodate all of the rear wheels of the truck or other vehicle.

OBJECTS OF THE INVENTION

Accordingly, a primary object of the present invention is to provide a mud flap suspension system which resiliently and flexibly supports the mud flaps behind wheels of a truck or other vehicle.

Another object of the present invention is to provide a mud flap suspension system which is attachable to a bumper, frame or other existing portion of a vehicle in a retrofit fashion.

Another object of the present invention is to provide a mud flap suspension system which allows the mud flaps to be located very close to the ground and prevent damage associated with pinching of the mud flaps between wheels of the vehicle and a fixed object, such as a curb.

Another object of the present invention is to mitigate damage caused by flying debris from wheels of a truck or other vehicle by facilitating the mounting of mud flaps very low to the ground behind wheels of the vehicle.

Another object of the present invention is to provide a mud flap suspension system which is easy to install.

Another object of the present invention is to provide a mud flap suspension system which can be mounted to either a rear bumper of a truck or other vehicle or to a central frame of a truck or other vehicle oriented along a direction of vehicle travel.

Other further objects of the present invention will become apparent from a careful reading of the included drawing figures, the claims and detailed description of the invention.

BRIEF DESCRIPTION OF THE DRAWINGS

FIG. 4 is a perspective view of a portion of that which is shown in FIG. 2, with enlargement of details shown therein.

FIG. 5 is a full sectional view of a portion of that which is shown in FIG. 4, taken along line 5-5 of FIG. 4.

FIG. 6 is a perspective view of a portion of that which is shown in FIG. 2, where the spring thereof couples to a pulley.

FIG. 7 is a perspective view similar to that which is shown in FIG. 6, but with the spring elongated.

FIG. 10 is a perspective view of an alternative embodiment of the mud flap suspension of this invention suitable for mounting to a central frame of a truck or other vehicle in two separate cantilevered single mud flap suspensions.

FIG. 11 is a perspective view of a portion of that which is shown in FIG. 10, with portions thereof removed to reveal interior details.

FIG. 12 is a perspective view similar to that which is shown in FIG. 11, but after translation of the mud flap in a downward direction.

DESCRIPTION OF THE PREFERRED EMBODIMENT

Figure 1:
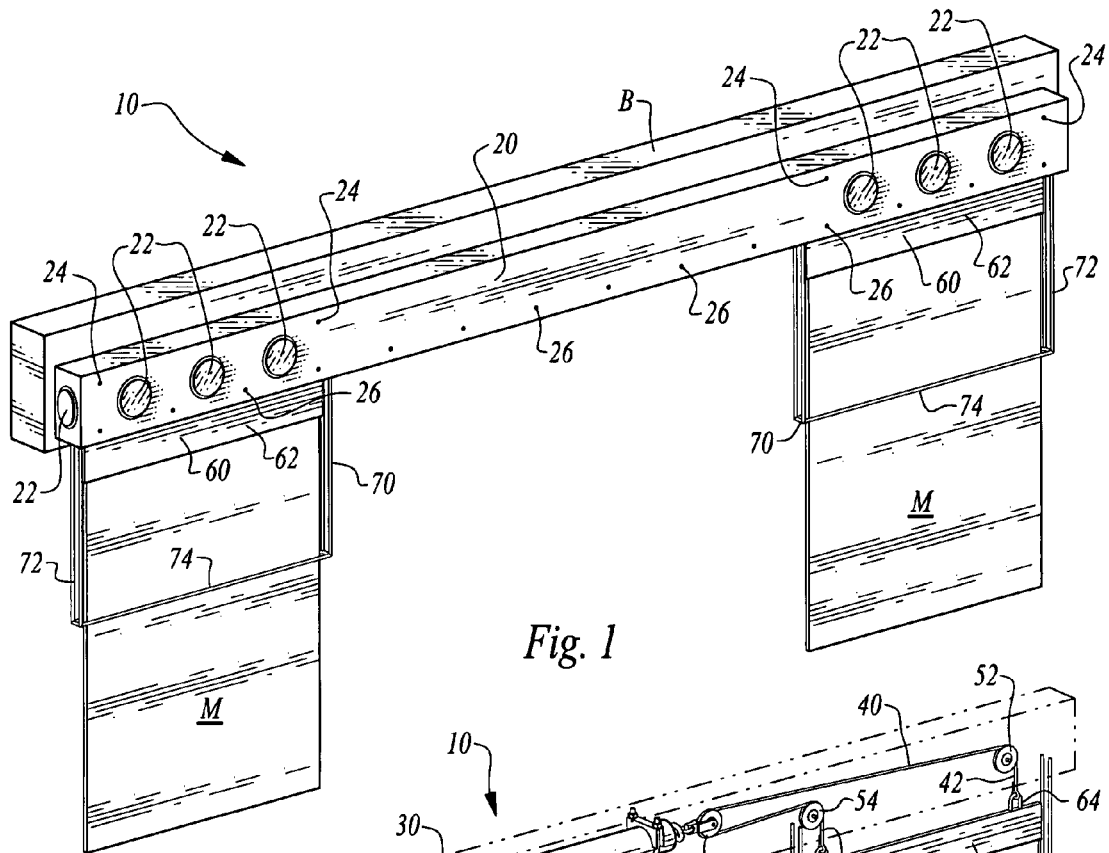
FIG. 1 is a perspective view of the mud flap suspension of this invention according to a preferred embodiment.

Referring to the drawings, wherein like reference numerals represent like parts throughout the various drawing figures, reference numeral 10 is directed to a suspension for mud flaps M (FIGS. 1, 2, 8 and 9). The suspension 10 mounts to a bumper B or other portion of a vehicle directly above where the mud flaps M are to be located. The mud flaps M can then extend down from the suspension 10 directly behind wheels of the vehicle. The suspension 10 allows the mud flaps M to translate (arrow T of FIG. 8) or rotate (arrow R of FIG. 8) downward, such as when the mud flaps M get pinched and drawn under the wheels while backing up.

Figure 2:
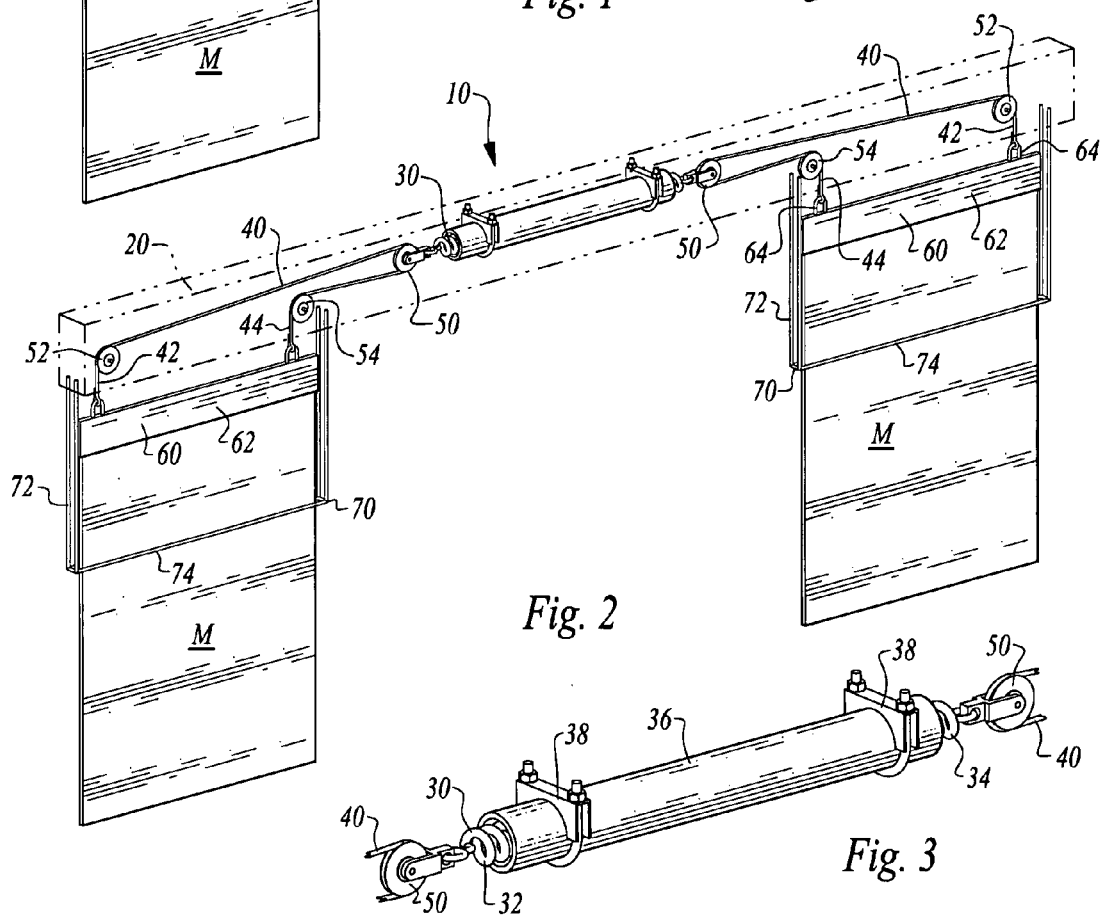
FIG. 2 is a perspective view similar to that which is shown in FIG. 1, but with a housing thereof removed to reveal interior details.
Figure 3:
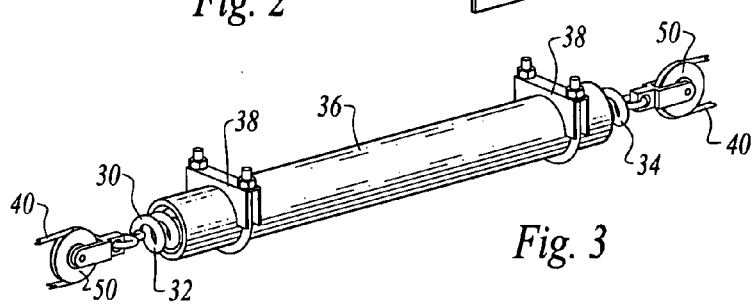
FIG. 3 is a perspective view of a spring and associated assembly of the mud flap suspension of this invention.

In essence, and with particular reference to FIGS. 1 and 2, basic details of the suspension 10 of this invention are disclosed according to a preferred embodiment. The suspension 10 is contained within a housing 20 adapted to be mounted to the bumper B or other portions of the vehicle which has the wheels that are shielded by the mud flaps M. A spring 30 (FIGS. 2-4) is located within the housing 20. This spring 30 provides a preferred form of resilient link for the suspension 10. The single spring 30 preferably acts as a resilient link for each of the mud flaps M. Cables 40 attach to each end of the spring 30. Each cable 40 suspends one of the mud flaps M therefrom. The cables 40 are preferably not directly attached to ends of the spring 30, but rather are routed over a pulley 50 with the pulley 50 mounted to each end of the spring 30. Each mud flap M has a bracket 60 at an upper end thereof which is coupled to each of the ends of the cable 40. A guide 70 is also provided surrounding the mud flap M, with the guide 70 keeping the mud flap M in a desired position and keeping the mud flap M from getting distorted out of position such as from loads associated with wind blowing on the mud flaps M.

More specifically, and with particular reference to FIG. 1, particular details of the housing 20 of the suspension 10 are described. The housing 20 acts as an enclosure to protect various different portions of the suspension 10 and provides a structure to which the various different portions of the suspension 10 can be mounted. The housing 20 in turn is adapted to be mounted to the bumper B or other portion of the vehicle to which the suspension 10 is to be mounted.

The housing 20 is generally an elongate hollow structure formed of rigid sheets, completely enclosing the housing 20 except for an undersurface thereof. The housing 20 has a long axis similar to an overall width of the vehicle. The housing 20 is preferably slightly taller than it is deep with a sufficient depth to support the spring 30 therein and sufficient height to accommodate routing of the cables 40 therein. The housing 20 preferably includes a plurality of lights 22 coupled to the electrical system of the vehicle. These lights 22 can provide a signaling capability such as turn signals, brake lights, nighttime running lights and general running lights. Most preferably, three lights 22 are provided at each end of the housing 20 with one additional light 22 at each end surface of the housing 20.

The housing 20 includes a plurality of mount holes 24 along an upper edge of the housing 20. These mount holes 24 can receive fasteners therethrough that can fasten into the bumper B so that the mount holes 24 facilitate coupling of the housing 20 and the entire suspension 10 to the bumper B of the vehicle. The housing 20 also preferably includes auxiliary flap holes 26 along a lower edge of the housing 20. These auxiliary flap holes 26 provide locations where additional mud flaps can be attached through appropriate fasteners. For instance, some truck operators prefer to have mud flaps extending laterally an entire width of the vehicle. Where the mud flaps M of this invention are deployed, if a mud flap M or the entire suspension 10 were to become damaged for some reason, a temporary mud flap could be mounted directly through the auxiliary flap holes 26 so that vehicle regulations can still be properly complied with. The housing 20 could be closed along a central portion of a lower surface of the housing 20, but preferably is open along an entire lower surface of the housing 20 so that the cables 40 and the guide 70 can extend up into an interior of the housing 20.

With particular reference to FIGS. 2-4, 6 and 7, details of the spring 30 are described according to a preferred embodiment. The spring 30 provides a preferred form of resilient link for suspending the mud flaps M from the bumper B of the vehicle. This spring 30 is preferably in the form of a linear expansion spring which has a shortest length when at rest with no loads applied thereto, and which can be stretched linearly. The spring exerts an opposite force tending to draw the spring back to its original at rest position, generally proportionate to the amount with which the spring 30 is linearly stretched. This spring 30 could be in a variety of different forms, such as a heavy-duty rubber band or other resilient structure, but is most preferably a helically bent length of spring steel extending from a left end 32 to a right end 34.

Most preferably, the spring 30 acts to suspend each of the mud flaps M, with the spring 30 floating and not directly fastened to the housing 20 or the bumper B. In particular, a sleeve 36 is preferably provided surrounding the spring 30 but not directly attached to the spring 30. The sleeve 36 is a hollow cylindrical tube having an inner diameter slightly greater than a diameter of the spring 30, so that the spring 30 can reside therein and be linearly extended and compressed without interfering with the sleeve 36. Clamps 38 mount the sleeve 36 to the housing 20. Preferably, the cables 40 are sufficiently short that the spring 30 is always slightly tensioned. In this way, the spring 30 resists rattling around inside the sleeve 36, and no slack is present in the cables 40 that might otherwise cause the cables 40 to become tangled or otherwise misaligned with other structures within the suspension 10.

With particular reference to FIGS. 2 and 4, details of the cables 40 of the preferred embodiment are described. The cables 40 could be in the form of an elongate flexible substantially inelastic structure that could be formed of bundles of wire or formed from synthetic or natural fibers woven or otherwise formed into an elongate rope or similar elongate flexible structure. Most preferably, these cables 40 are in the form of bundles of metal wire with an overall diameter, such as three-sixteenths of an inch, to handle the loads supplied by the spring 30 and by forces applied to the mud flap M.

The cables 40 extend from a first end 42 to a second end 44. Most preferably, these ends 42, 44 are each coupled to the mud flap M with the cable 40 routed so that an intermediate portion of the cable 40 is coupled to the spring 30. In particular, the ends 32, 34 of the spring 30 preferably each have a pulley 50 attached thereto in a manner which allows the pulley 50 to rotate but not translate away from the ends 32, 34 of the spring 30. The cable 40 is routed over a closest one of these two pulleys 50 and then extends toward each of the cable ends 42, 44 to a common mud flap M.

Rollers 52, 54 are provided adjacent each of the ends 42, 44 of the cable 40 to cause the cable 40 to bend from a substantially horizontal orientation extending away from the spring 30 to a substantially vertical orientation extending to the mud flap M. These rollers 52, 54 provide a preferred form of router, with other forms of routers for bending the cable 40 including sheaves or conceivably merely static posts. Alternatively, the cable 40 could be in the form of a chain and the pulley 50 and rollers 52, 54 could be in the form of sprockets. The cable 40 could also be configured in the form of a belt and the pulley 50 and rollers 52, 54 could be configured as slotted rollers having a contour similar to that of the cable 40 in the form of a belt, to keep the cable 40 in the form of a belt securely upon the rollers 52, 54.

While the ends 42, 44 of the cables 40 could attach directly to the mud flaps M, preferably upper ends of the mud flaps M include a bracket 60 thereon. This bracket 60 is preferably in the form of a pair of metal plates 62 oriented parallel to each other and adjacent upper ends of the mud flaps M. These plates 62 can be fastened together through the mud flaps M with the mud flap M sandwiched between the two plates 62 so that upper ends of the mud flaps M are securely held to the bracket 60.

The bracket 60 is also preferably configured so that the plates 62 are rigidly joined together along upper edges thereof. A pair of loops 64 extend vertically up from the bracket 60. These loops 64 provide convenient locations for the ends 42, 44 of the cable 40 to attach to the bracket 60. However, the cables 40 could e coupled to the mud flaps M in a variety of ways.

Most preferably, the cable 40 or the loops 64 of the bracket 60 include at least a portion thereof which is weakened somewhat and easy to replace. Such an area acts as a "mechanical fuse" so that if forces beyond design limits are exceeded, the suspension 10 breaks at this weakened area. This weakened area is made to be easily replaceable so that a new part can be easily put into this system. In this way, the pulley 50, rollers 52, 54, cable 40 and loops 64 of the bracket 60 and other portions of the bracket 60 are all generally preserved from damage should the suspension 10 be overloaded with too high of a force or caused to travel beyond maximum travel provided for the mud flaps M. The loops 64 are most preferably slidably coupled to the bracket 60 to allow the loops 64 to slide horizontally and to allow for precise positioning of the mud flaps M with the wheels.

With particular reference to FIGS. 1, 2, 4 and 5, details of the guides 70 are described. The guides 70 provide a frame which hold each mud flap M in a generally planar vertical orientation even when the mud flap M moves up or down through action of the suspension 10. The guides 70 are each configured with four vertical bars 72 extending down from the housing 20. While shown at corners of the guides 70, the vertical bars 72 are most preferably in board of the corners somewhat so that the vertical bars 72 help to keep the mud flaps M inside the guide 70. Horizontal bar circuits 74 form a loop around the mud flap M and is coupled to the vertical bars 72 at lower ends thereof. Each of these bars 72, 74 forming the guide 70 are preferably substantially rigid. The mud flap M is routed inboard of the vertical bars 72 and through the horizontal bar circuit 74 with primary support of the mud flap M through the guide 70 provided at the horizontal bar circuit 74.

Figure 8:
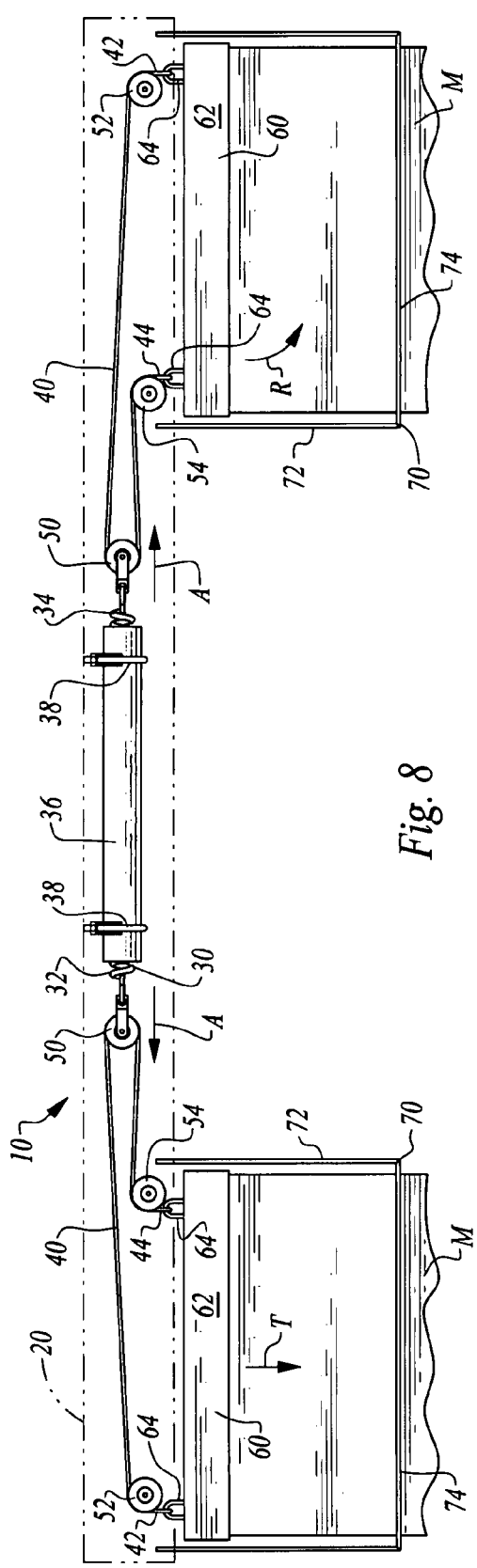
FIG. 8 is a rear elevation view of the mud flap suspension of this invention, similar to that of FIG. 2 and before resilient deflection of the mud flaps.
Figure 9:
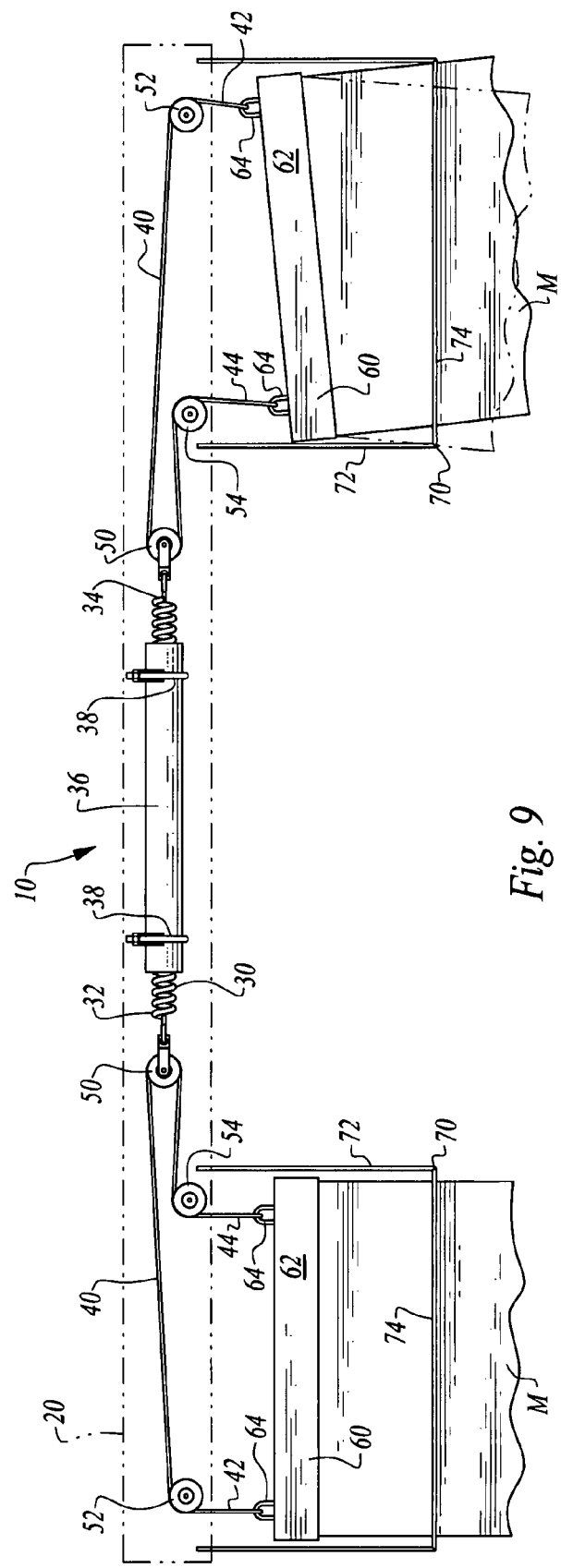
FIG. 9 is a rear elevation view similar to that which is shown in FIG. 8, but after translation of one of the mud flaps and after rotation of one of the mud flaps, illustrating the function of this invention.

In use and operation, and with particular reference to FIGS. 8 and 9, details of the function of the suspension 10 of this invention are described. After the suspension 10 has been mounted to the vehicle, such as by fastening the housing 20 to the bumper B of the vehicle, the suspension 10 is now ready for use. Should the vehicle be backed up against a curb, the mud flaps M according to this invention are configured sufficiently low to the ground (to maximize the mud flap's utility in precluding damage to other vehicles) that they may become trapped between a curb or other stationary object on the ground and the wheels adjacent the mud flaps M. When such pinching of the mud flaps M occurs, further slight rotation of the wheels causes a downward force to be exerted on the mud flaps M.

If the curb is encountered perpendicular to a direction of vehicle travel, this downward force on the mud flap M is generally a linear translational force T, such as that depicted by arrow T of FIG. 8 on the left mud flap M thereof. If the vehicle backs against a curb at an angle other than perpendicular, the mud flap M will be pinched in a non-uniform manner and downward forces on the mud flap M will be applied non-uniformly along a width of the mud flap M. A resulting rotational force R, depicted by arrow R of FIG. 8, shown at the right side of FIG. 8 is encountered.

With the suspension 10 of this invention, both translational loads T and rotational loads R can be accommodated. In particular, when the translational load T is experienced the mud flap M merely moves downwardly in response to this translational force. Each of the ends 42, 44 of the cable 40 are also drawn downward with portions of the cable 40 passing over the rollers 52, 54. An approximate midpoint of the cables 40 is routed over the pulley 50 and draws the pulley 50 horizontally away from the spring 30. Because the pulley 50 is coupled to the left end 32 of the spring 30, the spring 30 is elongated.

The rollers 52, 54 are rotatably mounted to portions of the housing 20 with the rollers 52, 54 otherwise remaining in fixed position. The pulley 50 can be similar in form to the rollers 52, 54 except that it is not held stationary, but rather floats along with the associated end 32, 34 of the spring 30. When the vehicle is moved away from the curb or other object and the downward forces on the mud flap M are relieved, the spring 30 exerts a return force which causes the mud flap M to return to its original position.

With continuing reference to FIG. 9, if the load is rotational, such as that depicted by arrow R, perhaps only one of the ends 42, 44 of the cable 40 is pulled downward as the mud flap M experiences rotation (FIG. 9, right half). The other end 44, 42 of the cable 40 might translate or not move at all. Still, the pulley 50 is translated horizontally (along arrow A of FIG. 8) causing the spring 30 to be elongated horizontally in response to this rotational load R on the mud flap M. When the mud flap M is released by movement of the vehicle away from the curb or other object, resilient forces within the spring 30 cause the mud flap M to return to its original position. Throughout the operation of the suspension 10, the mud flap M and suspension system are never caused to exceed design limits such that any damage occurs.

With particular reference to FIGS. 10-12, details of an alternative embodiment of this invention in the form of a single side suspension 110 are described. The single side suspension 110 is usable on vehicles that have a central elongate frame F generally extending along a direction of vehicle travel, and where the single side suspension 110 needs to cantilever perpendicularly away from a frame F mounting surface. In this embodiment, the single side suspension 110 is deployed in separate pairs to provide mud flap M suspension along both rear wheel sets of the vehicle, rather than a single suspension 10.

The single side suspension 110 includes a housing 120 generally similar to the housing 20 of the preferred embodiment except that it is shorter. The housing 120 includes lights 122 thereon as discussed above. A mount plate 123 is provided at an inboard end of the housing 120 which has a series of mount bolts 124 that can pass through the mount plate 123 and couple the mount plate 123 and other portions of the housing 120 rigidly to the frame F. Auxiliary flap holes can also be provided, such as along a lower edge of the housing 120 to which flaps can be attached in a fixed fashion if desired.

A spring 130 is provided within the housing 120 with the spring 130 providing a preferred form of resilient link for the single side suspension 110 and generally in the form of a linear extension spring. The spring 130 includes a fixed end 132 secured to the housing 120 and a free end 134 opposite the fixed end 132. A sleeve 136 is preferably provided to support the spring 130 and protect the spring, similar to the sleeve 36 of the preferred embodiment. Brackets 138 secure the sleeve 136 to the housing 120.

A cable 140 is provided extending from a first end 142 to a second end 144. The cable 140 is preferably similar in form to the cable 40 of the preferred embodiment. The cable 140 routing is with each of ends 142, 144 coupled to the mud flap M with a point of the cable 140 between the ends 142, 144 coupled to the spring 130. To allow the spring 130 to have plenty of linear travel (along arrow A of FIG. 11), an additional roller is preferably provided which facilitates 180° rotation. In particular, a roller 150 is fixed to an outboard end of the housing 120. A pulley 152 is coupled to the free end 134 of the spring 130. A pair of rollers 154, 156 are rotatably supported by the housing 120 and have the cable 140 bend 90° immediately before coupling to the mud flaps M.

Brackets 160 and a guide 170 are provided similar to the brackets 60 and guide 70 of the suspension 10 of the preferred embodiment. The cable 140 is routed from the first end 142, over the roller 142, around the pulley 152, around the roller 150, and over the roller 156 before reaching the second end 144 coupled to the bracket 160 of the mud flap M. The pulley 152 and roller 150 provide for substantially 180° of cable 140 bending, while the rollers 154, 156 provide for approximately 90° of cable 140 bending. While the rollers 150, 154 are shown separate from each other, they could be located stacked on a common axle, such as where the roller 154 is located.

In use, the single side suspension 110 functions similarly to that of the suspension 10 of the preferred embodiment except that the springs 130 of each single side suspension 110 act independently of each other. Also, the cable 140 routing is slightly different from that of the cables 40 of the preferred embodiment. In particular, when the mud flap M is translated or rotated in a downward direction, such as along arrow T of FIG. 11, portions of the cable 140 are drawn downward at either the first end 142, second end 144 or both, causing the spring 130 to be elongated and for the pulley 152 to translate linearly away from the spring 130. The guide 170 keeps the mud flap M aligned as it translated downward. When loads are removed from the mud flap M, the spring 130 provides a resilient force drawing the mud flap M back up until the bracket 160 of the mud flap is generally again adjacent to the rollers 154, 156.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A truck mud flap suspension apparatus featuring resilient support, the suspension apparatus comprising in combination:
   at least one spring;
   at least one cable;
   said cable coupled to said spring;
   said cable adapted to be coupled to a mud flap;
   said spring adapted to deflect when a tension force is applied to said cable by the mud flap moving at least partially downward;
   wherein said at least one cable has two ends, with at least one of said two ends coupled to the mud flap, said spring having at least one end with a pulley attached thereto and with a portion of said cable between said two ends routed over said pulley to couple said cable to said spring; and
   wherein each of said ends of said cable are respectively attached to the mud flap at laterally spaced locations on the mud flap, such that both resilient mud flap translation and resilient mud flap rotation are facilitated.

2. The suspension apparatus of claim 1 wherein a substantially rigid guide frame surrounds the mud flap when the mud flap is coupled to said cable, said guide frame affixed to a housing containing said spring and said cable and adapted to be mounted to a portion of a wheeled vehicle.

3. A flexible mud flap assembly, comprising in combination:

a housing adapted to be mounted to a rear portion of a wheeled vehicle;

at least one resilient link contained within said housing;

at least one cable coupled to said resilient link;

at least one mud flap;

said cable coupled to said mud flap;

said mud flap adapted to move downward at least partially while vertically tensioning said at least one cable and deflecting said resilient link, and said mud flap resiliently returning vertically upward when tension loads down on said mud flap are removed;

wherein said at least one resilient link includes a fixed end opposite a free end, said at least one cable coupled to said free end of said resilient link;

wherein said at least one cable has two ends with each of said two ends respectively coupled to the at least one mud flap at laterally spaced locations on said mud flap, with said cable coupled to said free end of said resilient link at a location between said ends of said cable; and wherein said free end of said resilient link includes a pulley thereon, said cable routed over said pulley at a location between said ends of said cable.

4. A flexible mud flap suspension, comprising in combination:

an elongate flexible substantially inelastic link having a first end and a second end opposite said first end;

at least one of said ends adapted to be coupled to a mud flap;

at least one resilient link;

said elongate flexible substantially inelastic link coupled to said resilient link such that tension loads applied by the mud flap on said elongate flexible substantially inelastic link cause said resilient link to elongate, allowing the mud flap to move at least partially downward;

wherein both said first end and said second end of said elongate flexible substantially inelastic link are adapted to be respectively coupled to the mud flap at laterally spaced locations on the mud flap, said elongate flexible substantially inelastic link coupled to said resilient link between said ends of said elongate flexible substantially inelastic link; and wherein said resilient link includes a pulley affixed thereto, said elongate flexible substantially inelastic link routed over said pulley such that said elongate flexible substantially inelastic link is coupled to said resilient link through said pulley.

5. The suspension of claim 4 wherein said resilient link includes a spring.

* * * * *